UNITED STATES PATENT OFFICE.

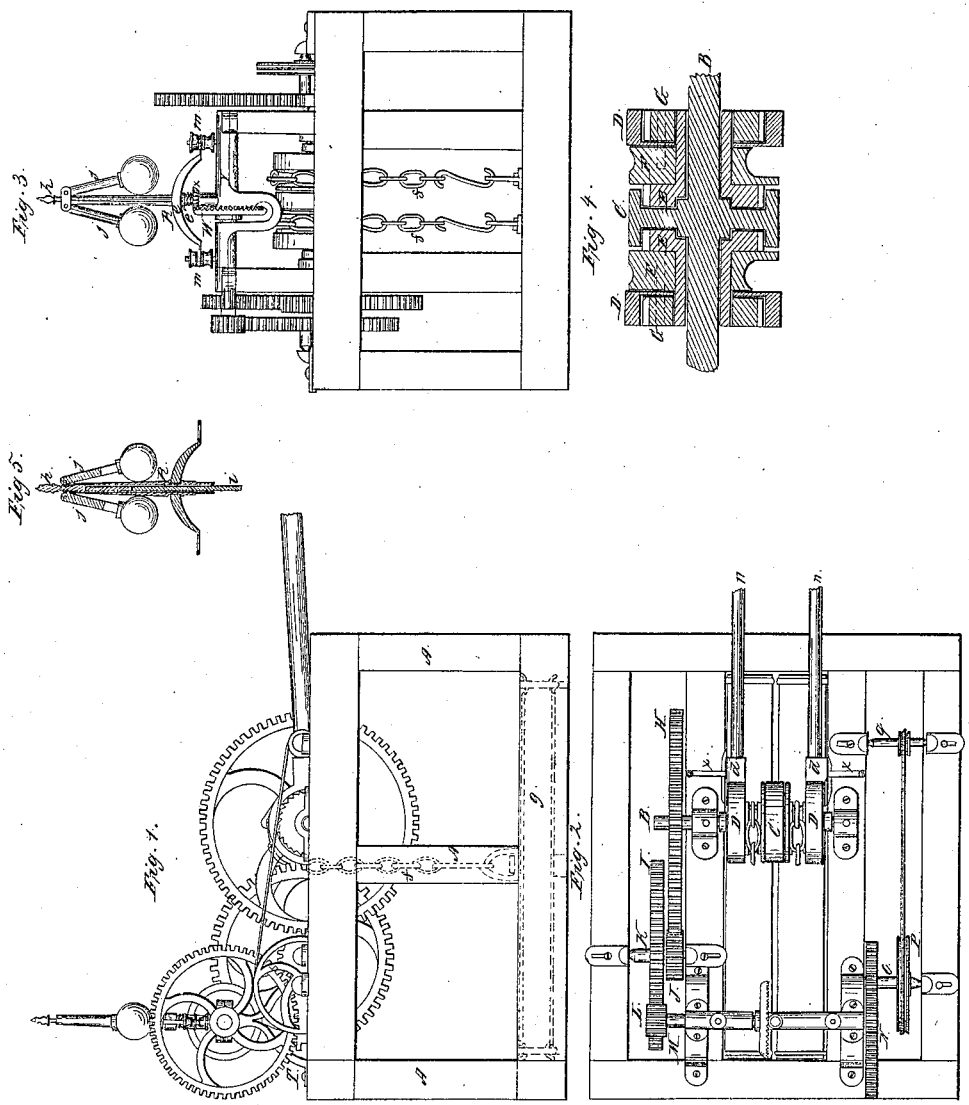

J. McKNIGHT AND WM. S. DEISHER, OF READING, PENNSYLVANIA.

IMPROVEMENT IN MOTIVE POWERS.

Specification forming part of Letters Patent No. 55,325, dated June 5, 1866.

*To all whom it may concern:*

Be it known that we, JOHN MCKNIGHT and WM. S. DEISHER, of Reading, in the county of Reading and State of Pennsylvania, have invented certain new and useful Improvements in Motive Powers; and we do hereby declare that the following is a full, clear, and exact description of the same, reference being had to the accompanying drawings, and to the letters of reference marked thereon.

In the annexed drawings, A represents the frame of the machine, which is made of timber sufficiently large and framed together in such a manner as to make said frame strong and durable. Lying across the two center timbers at the top of this frame is a shaft, B, which is provided with bearings in said timbers, and also with suitable caps for said bearings. About centrally located upon this shaft is a metallic hub, C, said hub being firmly secured upon said shaft. A broad annular groove is made in each face of the hub C, and in each of these grooves is placed a ratchet-wheel, E, said ratchet-wheels being each provided with a sleeve, as seen in Fig. 4, which slips over the shaft B. Small ratchet-teeth are provided and secured in the flanges of the grooves of hub C, which catch into the ratchet-teeth of wheels E and prevent said wheels from turning upon the shaft B in but one direction.

F F represent two metallic arms, which fit over the sleeves of wheel E and are firmly secured to said wheels.

G G represent two ratchet-wheels, which also pass over the sleeves of wheels E and are permanently secured to the cams F F, and consequently to the wheels E.

D D represent two metallic collars, which loosely surround the ratchet-wheels G G. Forming a part of these collars are two sockets, $d\ d$, which are intended to receive levers or handles for operating the machine with. Within the collars D D and secured to them are small ratchets, which are intended for catching into the teeth upon the wheels G G for the purpose of operating them.

Upon one end of the shaft B is a gear-wheel, H, which meshes into a small gear-wheel, J, upon a shaft, K, which has its bearings in the frame. Upon this shaft K is a large gear-wheel, I, which gears into a smaller wheel, L, upon shaft M. The shaft M lies above and across the frame A, being supported upon uprights T, which rest upon the frame.

N represents a gear-wheel upon shaft M, at the opposite end from wheel L, which gears into a small gear-wheel upon shaft O. This shaft O is provided with a pulley, which is connected by a belt or band to a pulley upon shaft $q$. The power of the machine is derived from the shaft $q$—that is, this is the shaft which transmits the power from the machine to the desired object.

V represents a cap, which is made in the form shown, and which fits over the shaft M. Erected upon this cap is a governor, which is intended to regulate the speed of the machine. The vertical shaft R of this governor is provided with a small bevel-gear wheel, $x$, which is driven by a gear-wheel, $w$, (also beveled,) upon the shaft M.

The shaft R is hollow, and a rod, $h$, passes down into said shaft from its top. This rod has a thread cut upon it near its top, and into this thread teeth upon the ends of the arms $j\ j$ fit and work. The upper ends of the arms $j\ j$, to which the governor-balls are attached, are pivoted to ears formed upon the shaft R. When the rod $h$ is raised its thread, catching in the teeth upon the ends of the arms $j\ j$, forces said arms down, preventing the balls from rising, and thus impeding the motion of the machine. A rod, $i$, passes into the lower end of shaft R and operates upon the rod $h$. The lower end of the rod $i$ rests in a socket upon the cap V.

$e$ represents a curved bar with a hole through its center, through which the shaft R passes. The under side of this bar presses upon a collar or flange upon the shaft R, and thus pressing the rod $h$ upon rod $i$, and the bottom of said rod $i$ against the bottom of the socket in the cap V, regulates the arms $j\ j$, and consequently the balls of said arms.

$e'$ represents a coiled spring around the shaft R, below the bar $e$, which serves to raise the shaft R, and thus free the rods $h$ and $i$ from pressure. The ends of the bar $e$ are confined down and said bar regulated by means of nuts or set-screws $m\ m$.

$f\ f$ represent chains, which pass around the cams F F upon shaft B, one of their ends being secured to said cams. The other ends of these chains pass down and are secured to hooks attached to springs g, which are secured in the frame A near its bottom.

The springs g are so secured and are made in such a form that they apply power when under tension to the cams F F.

In operating this machine, we wind the chains around the cams by means of the collars D D and the handles attached to them, and thus bring the spring to bear upon the shaft B. When pressure is removed from the handles n n the springs act in causing the shaft B to revolve, and thus convey motion through the various gear-wheels which have been described.

It will be seen that by the clutch arrangement described upon shaft B the machine is kept constantly in motion by operating one of the handles n forward while the other is moving back to catch a fresh hold upon the wheels G G.

The dogs or ratchet-teeth in the collars D D are thrown out of the teeth when the handles n reach a certain point by means of small springs secured upon the frame A and marked t, so that the handles move back, the collars D being thus freed in order to take hold on the wheels G G anew. By means of these two handles the machine is kept constantly in motion.

We do not propose to use the exact form of spring herein represented, as other forms will answer.

Having thus fully described our invention, what we claim as new, and desire to secure by Letters Patent, is—

1. The hub C, the ratchet-wheels E E, the cams F F, wheels G G, collars D D, and shaft B, arranged and used in the manner and for the purpose herein specified.

2. The arrangement of the cams F F, the chains f f, and the springs g g within the frame A, substantially as and for the purpose herein specified.

3. The rods h and i, the arms j j, the shaft R, and the bar e, arranged and used as and for the purpose herein specified.

As evidence that we claim the foregoing we have hereunto set our hands in the presence of two witnesses.

JOHN McKNIGHT.
WM. S. DEISHER.

Witnesses:
PETER CLEAVER,
GEO. WEIDENHAM.